United States Patent
Yokoyama et al.

(10) Patent No.: US 11,459,454 B2
(45) Date of Patent: Oct. 4, 2022

(54) POLYPROPYLENE COMPOSITION AND MOLDED ARTICLE

(71) Applicant: BASELL POLIOLEFINE ITALIA S.R.L., Milan (IT)

(72) Inventors: Yutaka Yokoyama, Kanagawa (JP); Akihiro Kamimura, Kanagawa (JP); Hiroshi Kajioka, Kanagawa (JP)

(73) Assignee: Basell Poliolefine Italia S.r.l., Milan (IT)

( * ) Notice: Subject to any disclaimer, the term of this patent is extended or adjusted under 35 U.S.C. 154(b) by 72 days.

(21) Appl. No.: 17/051,109

(22) PCT Filed: Apr. 25, 2019

(86) PCT No.: PCT/JP2019/018653
§ 371 (c)(1),
(2) Date: Oct. 27, 2020

(87) PCT Pub. No.: WO2019/208836
PCT Pub. Date: Oct. 31, 2019

(65) Prior Publication Data
US 2021/0230412 A1    Jul. 29, 2021

(30) Foreign Application Priority Data
Apr. 27, 2018  (JP) .............................. JP2018-087302

(51) Int. Cl.
C08L 23/12  (2006.01)
B29C 45/00  (2006.01)
C08J 3/12  (2006.01)
C08L 23/16  (2006.01)

(52) U.S. Cl.
CPC .......... *C08L 23/12* (2013.01); *B29C 45/0001* (2013.01); *C08J 3/12* (2013.01); *C08L 23/16* (2013.01); *C08L 2203/30* (2013.01); *C08L 2205/02* (2013.01)

(58) Field of Classification Search
CPC ...... C08L 23/12; C08L 23/16; C08L 2205/02; C08L 2207/02
See application file for complete search history.

(56) References Cited

U.S. PATENT DOCUMENTS

| | | | |
|---|---|---|---|
| 2010/0016510 A1* | 1/2010 | Malm | C08L 23/142 525/240 |
| 2012/0178882 A1* | 7/2012 | Massari | C08L 23/12 525/240 |
| 2017/0267794 A1 | 9/2017 | Lin et al. | |

FOREIGN PATENT DOCUMENTS

| | | |
|---|---|---|
| EP | 1935938 A1 | 6/2008 |
| JP | 2012214709 A | 11/2012 |
| WO | 2011036014 A1 | 3/2011 |
| WO | 2011036021 A1 | 3/2011 |

OTHER PUBLICATIONS

International Search Report and Written Opinion dated Jul. 26, 2019 (dated Jul. 26, 2019) for Corresponding PCT/JP2019/018653.

* cited by examiner

*Primary Examiner* — Mark S Kaucher

(57) ABSTRACT

A polypropylene composition made from or containing a polymer made from or containing: (i) component (1) made from or containing a propylene homopolymer having MFR of 100 to 300 (at a temperature of 230° C. under a load of 2.16 k(g) and containing more than 97.5% by weight of xylene insolubles (XI), wherein XI has a Mw/Mn of 4 to 10; (ii) component (2) made from or containing an ethylene/propylene copolymer containing 15 to 50% by weight of an ethylene-derived unit; wherein 1) relative proportions of component (1) and component (2) are, respectively, not less than 50 parts by weight but less than 70 pbw and more than 30 pbw but not more than 50 pbw, 2) intrinsic viscosity of xylene solubles (XSIV) of the polymer is in the range of 1.5 to 4.0 dl/g, 3) MFR of the polymer is in the range of 20 to 100 g/10 min.

4 Claims, No Drawings

POLYPROPYLENE COMPOSITION AND MOLDED ARTICLE

This application is the U.S. National Phase of PCT International Application PCT/JP2019/018653, filed Apr. 25, 2019, claiming benefit of priority to Japanese Patent Application No. 2018-087302, filed Apr. 27, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polypropylene composition and a molded product thereof.

BACKGROUND OF THE INVENTION

Polypropylene is used in various applications. However, it is believed that to prove useful as an automobile interior material, polypropylene should have improved impact resistance, stiffness and melt flowability.

SUMMARY OF THE INVENTION

[1] In a general embodiment, the present disclosure provides a polypropylene composition made from or containing a polymer made from or containing:
(i) component (1) made from or containing a propylene homopolymer having an MFR of 100 to 300 g/10 min (at a temperature of 230° C. under a load of 2.16 kg) and containing, based upon the total weight of the propylene homopolymer, 97.5% by weight or more of xylene insolubles (XI), wherein XI of the propylene homopolymer has an Mw/Mn of 4 to 10 as measured by GPC; and
(ii) component (2) made from or containing an ethylene/propylene copolymer containing 15 to 50% by weight of an ethylene-derived unit, based upon the total weight of the ethylene/propylene copolymer;
wherein
1) the relative proportions of component (1) and component (2) are, respectively, not less than 50 parts by weight but less than 70 parts by weight and more than 30 parts by weight but not more than 50 parts by weight, based upon the total weight of the polymer,
2) the intrinsic viscosity of xylene solubles (XSIV) of the polymer is in the range of 1.5 to 4.0 dl/g, and
3) the MFR (at a temperature of 230° C. under a load of 2.16 kg) of the polymer is in the range of 2.0 to 100 g/10 min.
[2] In some embodiments,
component (1) is porous particles having an average particle size of 1.5 to 4.0 mm and an average pore diameter (Dn) of 8 to 50 μm; and
the polymer is a powder, and flowability of the powder is 3.5 or less.
[3] In some embodiments, a pellet-shaped polypropylene composition is produced from the polypropylene composition.
[4] In some embodiments, the present disclosure provides a molded article obtained by injection molding of the polypropylene composition.
In some embodiments, the present disclosure provides a polypropylene composition without an organic peroxide.

DETAILED DESCRIPTION OF THE INVENTION

As used herein, a numerical range defined as "X to Y" includes the end values X and Y.
1. Polypropylene Composition
In some embodiments, the present disclosure provides a polypropylene composition made from or containing a polymer made from or containing:
(i) Component (1) made from or containing a propylene homopolymer having an MFR of 100 to 300 g/10 min (at a temperature of 230° C. under a load of 2.16 kg), containing, based upon the total weight of the propylene homopolymer, 97.5% by weight or more of xylene insolubles (XI), wherein the XI has an Mw/Mn of 4 to 10 as measured by GPC; and
(ii) Component (2) made from or containing an ethylene/propylene copolymer containing 15 to 50% by weight of an ethylene-derived unit, based upon the total weight of the ethylene/propylene copolymer.
(1) Component (1)
In some embodiments, component (1) is made from or containing a propylene homopolymer having an MFR of 100 to 300 g/10 min (at a temperature of 230° C. under a load of 2.16 kg), containing, based upon the total weight of propylene homopolymer, 97.5% by weight or more of xylene insolubles (XI), wherein the XI has an Mw/Mn of 4 to 10 as measured by GPC. In some embodiments, the propylene homopolymer component includes, based upon the total weight of the propylene homopolymer, less than 0.5% by weight of monomer units other than propylene, arising from a recycled gas, or the like generated in production of the polymer containing a copolymer component. In some embodiments, MFR of component (1) is 150 to 300 g/10 min, alternatively 180 to 300 g/10 min. In some embodiments, XI is 98.0% by weight or more, 98.3% by weight or more, based upon the total weight of the propylene homopolymer. In some embodiments, Mw/Mn is 4 to 8, alternatively 5 to 7.

In some embodiments, component (1) is a powder. In some embodiments, the particles thereof have an average particle size (diameter) of 1.5 to 4.0 mm, alternatively 1.5 to 3.0 mm. The average particle size is an arithmetic average diameter of particles photographed by the optical microscopic method defined in JIS Z8901. In some embodiments, the number of particles per gram is measured to determine the average weight per piece and the average volume per piece is determined from the bulk density, so that the average particle size is obtained as the average diameter of spheres from the average volume. In some embodiments, the bulk density is measured by dividing the volume (bulk volume) of component (1) placed in a sealed container by the weight.

In some embodiments, component (1) is made of porous particles having an average pore diameter Dn of 8 to 50 μm. As used herein, Dn is an average of pore diameters 1) measured by the mercury porosimetry according to JIS R1655, In some embodiments, Dn is 8 to 30 μm, alternatively 8 to 15 μm.

(2) Component (2)
In some embodiments, component (2) is made from or containing an ethylene/propylene copolymer, containing 15 to 50% by weight of ethylene-derived units, based upon the total weight of the ethylene/propylene copolymer. In some embodiments, the upper limit of the content of ethylene-derived units is 50% by weight or less, alternatively 40% by weight or less, alternatively 35% by weight or less, based upon the total weight of the ethylene/propylene copolymer.

In some embodiments, the lower limit of the content of the ethylene-derived units is 15% or more, alternatively 20% by weight or more, based upon the total weight of the ethylene/propylene copolymer.

(3) Composition Ratio

In some embodiments, the relative proportions (weight ratio) of component (1) and component (2) are, respectively, not less than 50 parts by weight but less than 70 parts by weight; and more than 30 parts by weight but not more than 50 parts by weight, based upon the total weight of the polymer. In some embodiments, the relative proportions of component (1) and component (2) are not less than 55 but less than 70 and more than 30 but not more than 45, respectively (the ratio is "55 to 65":"35 to 45") based upon the total weight of the polymer. In some embodiments, the relative proportions of component (1) and component (2) are not less than 55 but not more than 65 and not less than 35 but not more than 45, respectively, based upon the total weight of the polymer.

(4) Characteristics of Polymer Consisting of Component (1) and Component (2)

1) XSIV

In some embodiments, the intrinsic viscosity (XSIV) of xylene solubles (XS) of the polymer made from or containing component (1) and component (2) is an index of the molecular weight of the components having non-crystallinity in the polymer. As used herein, XSIV is determined by obtaining components soluble in xylene at 25° C. and measuring the intrinsic viscosity of the components. In some embodiments, XSIV is in the range of 1.5 to 4.0 dl/g, alternatively 1.5 to 3.5, alternatively 1.5 to 3.0.

2) MFR

In some embodiments, the MFR of the polymer made from or containing component (1) and component (2) measured at a temperature of 230° C. under a load of 2.16 kg, is in the range of 20 to 100 g/10 min, alternatively 2.5 to 60 g/10 min, alternatively 28 to 50 g/10 min.

3) Structure and the Like

In some embodiments, the polypropylene composition is made from or containing a polymer made from or containing components (1) and (2), and other components. In some embodiments, the other components are selected from the group consisting of additives and fillers. In some embodiments, the polymer made from or containing components (1) and (2) has a structure where component (2) is dispersed in component (1) and component (2) is held in pores of component (1). In some embodiments, component (2) is a viscoelastic material held in the pores of component (1) as porous particles, and the polymer is a powder form. In some embodiments, the powder has a powder flowability of 3.5 or less. As used herein, the powder flowability refers to the flowability of a powder polymer produced in a polymerization reactor, and an index of the production stability of the polymer. The powder flowability is a quantified value of the flowability of powder, when the powder on a substrate flows on a tilted substrate after removal of a specified load applied to the powder placed on the substrate at a specified temperature for a specified time period. In some embodiments, the powder flowability of the polymer is 3.5 or less, alternatively 3.0 or less, alternatively 2.0 or less.

The powder flowability is measured by the following method.

On a metal substrate (first substrate), a frame having an opening with a length of 5 cm, a width of 5 cm, and a height of 1 cm was placed. In the frame, 5 g of powder polymer made from or containing components (1) and (2) was spread. A second substrate was placed on the frame. A uniform pressure of 23 g/cm$^2$ was applied. After the sample in the frame was held at 70° C. for 20 minutes, the frame and the second substrate were removed. The first substrate was tilted to evaluate the degree of collapse of the sample based on the following criteria.

1: The total volume of sample collapses when the substrate is tilted at 0° or more and less than 30°.

2: The total volume of sample collapses when the substrate is tilted at 30° or more and less than 50°.

3: The total volume of sample collapses when the substrate is tilted at 50° or more and less than 70°.

4: The total volume of sample collapses when the substrate is tilted at 70° or more and less than 90°.

5: No total volume collapse occurs even when the substrate is tilted at 90° or more.

In some embodiments, the first substrate and the second substrate were made of stainless steel. In some embodiments, the first substrate has a surface roughness (maximum roughness Ry) of 1 µm or less, thereby rendering the first substrate unaffected by friction with the powder.

(6) Other Components

In some embodiments, the polypropylene composition is further made from or containing an additive selected from the group consisting of antioxidants, chlorine absorbers, heat-resistant stabilizers, light stabilizers, ultraviolet absorbers, internal lubricants, external lubricants, antiblocking agents, antistatic agents, antifogging agents, flame retardants, dispersants, nucleating agents, copper inhibitors, neutralizers, plasticizers, defoaming agents, crosslinking agents, oil extensions, and other organic and inorganic pigments. In some embodiments, the polypropylene composition is further made from or containing resins or elastomers other than the resin components, within a range not impairing the usefulness of the polypropylene composition.

In some embodiments, the polypropylene composition is further made from or containing fillers as components other than the additives, within a range not impairing the usefulness of the polypropylene composition. In some embodiments, fillers are added to improve the stiffness of the material. In some embodiments, fillers are selected from the group consisting of inorganic fillers and organic fillers. In some embodiments, the inorganic fillers are selected from the group consisting of talc, clay, calcium carbonate, magnesium hydroxide and glass fiber. In some embodiments, the organic fillers are selected from the group consisting of carbon fiber and cellulose fiber. In some embodiments and to improve the dispersibility of the fillers, the fillers are subjected to surface treatment, or a master batch of the filler and the resin is prepared. In some embodiments, the filler is talc.

(6) Pellet

In some embodiments, the polypropylene composition is in a powder form. In some embodiments, a pellet is formed from the powder through melting and kneading. As used herein, the term "pellet" refers to a pelletized article having a certain shape such as a spherical, ellipsoid, cylindrical, or prism shape. In some embodiments, the pellet is made by melting and kneading the powder polymer, and then extruding the polymer to be cut by a cutter or pelletizer. In some embodiments, the size of the pellet is not limited. In some embodiments, the weight per particle is 10 to 40 mg. In some embodiments, the other components of the polypropylene composition are added to the polymers in granulation. In some embodiments, the pellet after granulation is blended with the other components, thereby yielding the polypropylene composition.

2. Production Method

In some embodiments, the polymer is produced by polymerizing a raw material monomer of component (1) and raw material monomers of component (2) by using two or more reactors. In some embodiments, a raw material monomer of component (1) is polymerized to produce a homopolymer of component (1). In some embodiments, raw material monomers of component (2) are polymerized in the presence of the homopolymer, thereby producing the copolymer. In some embodiments, the polymerization of component (1) and component (2) is performed in a liquid phase, a gas phase or a liquid-gas phase.

In some embodiments, a Ziegler-Natta catalyst made from or containing (a) a solid catalyst containing magnesium, titanium, a halogen, and an internal electron donor; (b) an organoaluminium compound; and, optionally (c) an external electron donor, is used. In some embodiments, a metallocene catalyst is used.

(1) Solid Catalyst (Component (a))

In some embodiments, solid catalyst component (a) is prepared by bringing a magnesium compound, a titanium compound and an electron donor compound into contact with each other. In some embodiments, the conditions for contact among the compounds contained in the component and the conditions for precipitation are adjusted by a method depending on the constituent components of the solid catalyst, the types of solvent and dispersant selected, the temperature of solvent, and the stirring rate, thereby providing catalyst particles having an average diameter (average particle size) in a certain range and an average pore diameter in a certain range. In some embodiments, the polymer particle has a similar figure to the catalyst particle and is described as a "replica," thereby, through the control of the shape of the catalyst particle and by polymerizing with the catalyst particle, the average particle size (diameter) and the average pore diameter (Dn) of the propylene homopolymer (component (1)) are within certain ranges.

In some embodiments, the titanium compound used to prepare component (a) is a tetravalent titanium compound represented by the formula: $Ti(OR)_gX_{4-g}$. In the formula, R represents a hydrocarbon group and X represents a halogen, and $0 \leq g \leq 4$. In some embodiments, the titanium compound is selected from the group consisting of tetra-halogenated titanium compounds, tri-halogenated alkoxytitaniums, di-halogenated alkoxytitaniums, mono-halogenated tri-alkoxytitaniums, and tetra-alkoxytitaniums. In some embodiments, the tetra-halogenated titanium compound is selected from the group consisting of $TiCl_4$, $TiBr_4$ and $TiI_4$. In some embodiments, the tri-halogenated alkoxytitanium is selected from the group consisting of $Ti(OCH_3)_2Cl_3$, $Ti(OC_2H_5)Cl_3$, $Ti(O_n-C_4H_9)Cl_3$, $Ti(OC_2H_5)Br_3$ and $Ti(OisoC_4H_9)Br_3$. In some embodiments, the di-halogenated alkoxytitanium is selected from the group consisting of $Ti(OCH_3)_2Cl_2$, $Ti(OC_2H_5)_2Cl_2$, $Ti(O_n-C_4H_9)_2Cl_3$, and $Ti(OC_2H_5)_2Br_2$. In some embodiments, the mono-halogenated tri-alkoxytitanium is selected from the group consisting of $Ti(OCH_3)_3Cl$, $Ti(OC_2H_5)_3Cl$, $Ti(O_n-C_4H_9)_3Cl$ and $Ti(OC_2H_5)_3Br$. In some embodiments the tetra-alkoxytitanium is selected from the group consisting of $Ti(OCH_3)_4$, $Ti(OC_2H_5)_4$ and $Ti(O_n-C_4H_9)_4$. In some embodiments, the titanium compound is a halogen-containing titanium compound, alternatively a tetra-halogenated titanium, alternatively titanium tetrachloride.

In some embodiments, the magnesium compound used to prepare component (a) is a magnesium compound having a magnesium-carbon bond or a magnesium-hydrogen bond. In some embodiments, the magnesium compound is selected from the group consisting of dimethylmagnesium diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxy magnesium, ethylbutyl magnesium and butylmagnesium hydride. In some embodiments, the magnesium compounds is used in a form of complex compound with organoalutninium. In some embodiments, the magnesium compounds is used in a liquid form or a solid form. In some embodiments, the magnesium compound is selected from the group consisting of halogenated magnesiums, alkoxymagnesium halides, allyloxymagnesium halides, alkoxymagnesiums, an allyloxymagnesium; and carboxylates of magnesium. In some embodiments, the magnesium compound is a halogenated magnesium is selected from the group consisting of magnesium chloride, magnesium bromide, magnesium iodide and magnesium fluoride. In some embodiments, the magnesium compound is an alkoxymagnesium halide is selected from the group consisting of methoxymagnesium chloride, ethoxymagnesium chloride, isopropoxymagnesium chloride, butoxymagnesium chloride and octoxymagnesium chloride. In some embodiments, the magnesium compound is an allyloxymagnesium halide is selected from the group consisting of phenoxymagnesium chloride and methylphenoxy magnesium chloride. In some embodiments, the magnesium compound is an alkoxymagnesium is selected from the group consisting of ethoxymagnesium, isopropoxymagnesium, butoxymagnesium, n-octoxymagnesium and 2-ethylhexoxymagnesium. In some embodiments, the magnesium compound is an allyloxymagnesium is selected from the group consisting of phenoxymagnesium and dimethylphenoxy magnesium. In some embodiments the magnesium compound is a carboxylate of magnesium is selected from the group consisting of magnesium laurate and magnesium stearate.

In some embodiments and as used herein, the electron donor compound used to prepare compound (a) is referred to as "internal electron donor compound". In some embodiments, the electron donor compound is selected from the group consisting of phthalate compounds, succinate compounds, diether compounds, diphenyl dicarbonates, cyclohexene dicarbonates, dicycloalkyl di carbonates, diol dibenzoates, and 1,2-phenylene dibenzoates. In some embodiments, the electron donor compound is a diphenyl dicarbonate as described in Japanese Patent Publication No. JP 2013-28704A. In some embodiments the electron donor compound is a cyclohexene dicarbonate as described in Japanese Patent Publication No. JP 2014-201602A. In some embodiments, the electron donor compound is a dicycloalkyl dicarbonate as described in Japanese Patent Publication No. JP 2013-28705A. In some embodiments, the electron donor compound is a diol dibenzoate as described in Japanese Patent Publication No. JP 495992013. In some embodiments, the electron donor compound is a 1,2-phenylene dibenzoate as described in Patent Cooperation Treaty Publication No. WO 2010/078494.

(2) Organoaluminium Compound (Component (b))

In some embodiments, the organoaluminium compound of component (b) is selected from the group consisting of:
trialkylaluminums;
trialkenylaluminums;
dialkylaluminum alkoxides;
alkyl aluminum sesquialkoxides;
partially halogenated alkylaluminums;
dialkylaluminum hydrides;

partially hydrogenated alkylaluminums; and
partially alkoxylated and halogenated alkylaluminums.

In some embodiments, the trialkylaluminum is selected from the group consisting of triethylaluminum and tributylaluminum. In some embodiments, the trialkenylaluminum is tri-isoprenylaluminum. In some embodiments, the dialkylaluminum alkoxides are selected from the group consisting of diethylaluminum ethoxide and dibutylalurninum butoxide. In some embodiments, the alkylaluminum sesquialkoxides are selected from the group consisting of ethylaluminum sesquiethoxide and butylaluminum sesquibutoxide. In some embodiments, the partially halogenated alkylaluminum is selected from the group consisting of alkylaluminum dihalogenides and alkylalutninum dihydrides. In some embodiments, the alkylaluminum dihalogenide is selected from the group consisting of ethylaluminum dichloride, propylaluminum dichloride, and butylaluminum dibromide. In some embodiments, the alkylaluminum dihydrides are selected from the group consisting of ethylaluminum dihydride and propylaluminum dihydride. In some embodiments, the dialkylaluminum hydrides are selected from the group consisting of diethylalutninum hydride and dibutylaluminum hydride. In some embodiments, the partially hydrogenated alkylaluminums are selected from alkylaluminum dihydrides. In some embodiments, the alkylaluminum dihydrides are selected from the group consisting of ethylaluminum dihydride and propylaluminum dihydride. In some embodiments, the partially alkoxylated and halogenated alkylaluminum is selected from the group consisting of ethylaluminum ethoxychloride, butylaluminum butoxychloride, and ethylaluminum ethoxybromide.

(3) Electron Donor Compound (Component (c))

As used herein, the electron donor compound of component (c) is referred to as "external electron donor compound". In some embodiments, the electron donor compound is an organosilicon compound. In some embodiments, the organosilicon compound is selected from the group consisting of:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-totyldimethoxysilane, bis-p-tolyldimethoxysilane, bis-p-totyldiethoxysilane, bisethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane), vinylniacetoxysilane, dimethyltetraethoxydisiloxane, methyl(3,3,3-trifluoron-propyl)dimethoxysilane, cyclopentyl-t-butoxydimethoxysilane, diisobutyldimethoxysilane, isobutylisopropyldimethoxysilane, n-propyltrimethoxysilane, di-n-propyldimethoxysilane, thexyltrimethoxysilane, t-butylethyldimethoxysilane, t-butylpropyldimethoxysilane, t-butyl-t-butoxydimethoxysilane, isobutyltrimethoxysilane, cyclohexylisobutyldimethoxysilane, di-sec-butyldimethoxysilane, isobutylmethyldimethoxysilane, bis(decahydroisoquinolin-2-yl)dimethoxysilane, diethylaminotriethoxysilane, dicyclopentyl-bis(ethylamino)silane, tetraethoxysilane, tetramethoxysilane and isobutyltriethoxysilane.

In some embodiments, the organosilicon is selected from the group consisting of ethyltriethoxysilane, n-propyltriethoxysilane, n-propyltrimethoxysilane, t-butyltriethoxysilane, t-butylmethyldimethoxysilane, t-butylmethyldiethoxysilane, t-butylethyldimethoxysilane, t-butylpropyldimethoxysilane, t-butyl-t-butoxydimethoxysilane, t-butyltrimethoxysilane, i-butyltrimethoxysilane, isobutylmethyldimethoxysilane, i-butyl-sec-butyldimethoxysilane, ethyl(perhydroisoquinolin-2-yl)dimethoxysilane, bis(decahydroisoquinolin-2-yl)dimethoxysilane, tri(isopropenyloxy)phenylsilane, thexyltrimethoxysilane, vinyltriethoxysilane, phenyltriethoxysilane, phenyltrimethoxysilane, vinyltributoxysilane, diphenyldimethoxysilane, diisopropyldimethoxysilane, diisobutyldimethoxysilane, i-butyl-i-propyldimethoxysilane, cyclopentyl-t-butoxydimethoxysilane, dicyclopentyldimethoxysilane, cyclohexylmethyldimethoxysilane, cyclohexyl-i-butyldimethoxysilane, cyclopentyl-i-butyldimethoxysilane, cyclopentylisopropyldimethoxysilane, di-sec-butyldimethoxysilane, diethylaminotriethoxysilane, tetraethoxysilane, tetramethoxysilane, isobutyltriethoxysilane, phenymethyldimethoxysilane, phenyltriethoxysilane, bis-p-tolyldimethoxysilane, p-tolylmethyldimethoxysilane, dicyclohexyldimethoxysilane, cyclohexylethyldimethoxysilane, 2-norbornanetriethoxysilane, 2-norbornanemethyldimethoxysilane, diphenyldiethoxysilane, methyl(3,3,3-trifluoropropyl)dimethoxysilane, ethyl silicate and the like.

(4) Polymerization

Raw material monomers are brought into contact with the catalyst, thereby performing the polymerization. In some embodiments, pre-polymerization is performed by using the catalyst. As used herein, pre-polymerization is a step of forming a polymer chain as a scaffold of the subsequent final polymerization of the raw material monomers on the solid catalyst component. In some embodiments, pre-polymerization is performed at 40° C. or less, alternatively 30° C.' or less, alternatively 20° C. or less. Subsequently, the catalyst after pre-polymerization (pre-polymerized catalyst) is introduced into a polymerization reaction system for the final polymerization of the raw material monomers. In some embodiments, the polymerization is performed in a liquid phase, a gas phase or a liquid-gas phase. In some embodiments, the polymerization temperature is ambient temperature to 150° C., alternatively 40° C. to 100° C. In some embodiments, the polymerization pressure is in the range from 3.3 to 6.0 MPa for the polymerization in a liquid phase. In some embodiments, the polymerization pressure is in the range from 0.5 to 3.0 MPa for the polymerization in a gas phase. In some embodiments, a molecular weight adjusting agent is used. In some embodiments, the molecular weight adjusting agent is a chain transfer agent. In some embodiments, the chain transfer agent is selected from the group consisting of hydrogen and $ZnEt_2$.

In some embodiments, a polymerization reactor having gradient in the monomer concentration and the polymerization conditions is used. In some embodiments, at least two polymerization areas are connected, thereby achieving polymerization of monomers through gas-phase polymerization. In some embodiments and in the presence of a catalyst, the monomers are supplied to the polymerization area of a riser for polymerization, and the monomers are supplied to the polymerization area of a downcomer connected to the riser for polymerization, thereby collecting a polymer product circulated through the riser and the downcomer. In some embodiments, the method prevents thoroughly or partially a gas mixture present in the riser from entering the downcomer. Also, a gas or liquid mixture having a composition different from the gas mixture present in the riser is introduced into the downcomer. In some embodiments, the polymerization method is as described in Japanese Patent Publication No. JP 2002-520426A.

3. Application

In some embodiments, the polypropylene composition is a resin composition for injection molding.

1) Stiffness (flexural modulus): JIS K6921-2

In some embodiments, the polypropylene composition has a flexural modulus of 700 MPa or more, alternatively 800 MPa or more, alternatively 900 MPa or more.

2) Charpy impact strength: JIS K6921-2

In some embodiments, the polypropylene composition has a Charpy impact strength of 20 kJ/m$^2$ or more, alternatively 25 kJ/m$^2$ or more, alternatively 30 kJ/m$^2$ or more.

3) Nominal tensile strain at break: JIS K6921-2

In some embodiments, the polypropylene composition has a nominal tensile strain at break of 20% or more, alternatively 30% or more, alternatively 40% or more.

In some embodiments, the polypropylene composition is used for automobile interior materials and food packaging materials. In some embodiments, the propylene composition is injection molded to directly make a product. In some embodiments, the propylene composition is injection molded to make a thin molded article. In some embodiments, the thin-molded article is a sheet. In some embodiments, the thin-molded article is subjected to secondary processing. In some embodiments, the secondary processing is selected from the group consisting of vacuum forming and pressure forming. In some embodiments, the polypropylene composition is used for general miscellaneous articles.

EXAMPLES

Example 1

A solid catalyst composed of Ti and diisobutylphthalate as an internal donor supported on MgCl$_2$ was prepared by a method described in lines 46 to 53 in Example 5 of European Patent Publication No. 728769.

Microspheroidal MgCl$_2$.2.1C$_2$H$_5$OH was produced in the following manner. Under an inert gas at ambient temperature, 48 g of anhydrous MgCl$_2$, 77 g of anhydrous C$_2$H$_5$OH and 830 mL of kerosene were put in a 2-L autoclave having a turbine stirrer and a suction pipe. While stirring, the content was heated to 120° C., thereby forming an adduct between MgCl$_2$ and the alcohol. The adduct was melted and mixed with a dispersant. The nitrogen pressure in the autoclave was maintained at 15 atm. The suction pipe of the autoclave was heated to 120° C. from the outside with use of a heating jacket. The suction pipe had an inner diameter of 1 mm, and a length of 3 m from one end to the other end of the heating jacket. Through the pipe, the mixture flowed at a rate of 7 m/sec. At an outlet of the pipe, the dispersion was collected in a 5-L flask containing 2.5 L of kerosene while stirring, and being cooled from the outside with a jacket of which initial temperature was maintained at −40° C. The final temperature of the dispersion was 0° C. A spherical solid product constituting the dispersed phase of the emulsion was sedimentation-precipitated, separated by filtration, washed with heptane and dried. The operations were performed in an inert gas atmosphere. Solid spherical particle MgCl$_2$.3C$_2$H$_5$OH having a maximum diameter of 50 μm or less was thus obtained. The yield was 130 g. Alcohol was removed from the product until the alcohol content decreased to 2.1 mol per mole of MgCl$_2$, by gradually raising temperature from 50° C. to 100° C. in a nitrogen stream.

In a 500-mL cylindrical glass reactor having a filtration barrier, 225 mL of TiCl$_4$ was put at 0° C., and further, 10.1 g (54 mmol) of microspheroidal MgCl$_2$.2.1C$_2$H$_5$OH was put therein over 15 minutes while stirring the content. The temperature was then raised to 40° C., and 9 mmol of diisobutylphthalate was put therein. The temperature was raised to 100° C. over 1 hour, and stirring was continued for further 2 hours. Subsequently, TiCl$_4$ was removed by filtration, and while stirring for further 1 hour at 120° C., 200 mL of TiCl$_4$ was added. Finally, the content was filtered and washed with n-heptane at 60° C. until total extinction of chlorine ions from the filtrate. The catalyst component thus obtained contained 3.3% by weight of Ti and 8.2% by weight of diisobutylphthalate.

Subsequently, the solid catalyst, triethylaluminium (TEAL) as an organoaluminum compound, and dicyclopentyldimethoxysilane (DCPMS) as an external electron donor compound were brought into contact with each other at a weight ratio of TEAL to the solid catalyst of 20 and a weight ratio of TEAL to DCPMS of 10, at 12° C. for 24 minutes, thereby obtaining a catalyst.

The catalyst was maintained in a suspension state in liquid propylene at 20° C. for 5 minutes for pre-polymerization to proceed, thereby obtaining a prepolymer. The prepolymer was introduced to a first-stage polymerization reactor of a polymerization unit having two-stage polymerization reactors in series, and propylene was further supplied thereto for the polymerization to proceed, thereby obtaining a propylene homopolymer as component (1). The propylene homopolymer as component (1) in powder form had an average particle size of 2.2 mm, and an average pore diameter of 9.4 μm. To a second-stage polymerization reactor, the propylene homopolymer, ethylene and propylene were supplied for the polymerization to proceed, thereby producing an ethylene/propylene copolymer as component (2) as well as a polymer made from and containing component (1) and component (2).

During polymerization, the temperature and the pressure were adjusted, and hydrogen was used as a molecular weight adjusting agent. In the first-stage polymerization reactor, the polymerization temperature and hydrogen concentration were 70° C. and 2.44 mol %, respectively. In the second-stage polymerization reactor, the polymerization temperature, the hydrogen concentration and the molar ratio C2/(C2+C3) were 80° C., 1.88 mol %, and a molar ratio of 0.21, respectively. As used herein, "C2" and "C3" represent ethylene and propylene, respectively. Also, the residence time distribution between the first stage and the second stage was adjusted to have a ratio of the ethylene/propylene copolymer component as component (2) to the polypropylene polymer made from or containing component (1) and component (2), that is, component (2)/[component (1)+component (2)], of 36.0% by weight. The data on the characteristics of component (1), component (2) and the polymer made from or containing component (1) and component (2) are shown in Table 1.

To 100 parts by weight of a polymer made from or containing component (1) and component (2), 0.25 parts by weight of B225 manufactured by BASF as an antioxidant, 0.05 parts by weight of UHT-4A manufactured by Kyowa Chemical Industry Co., Ltd. as a neutralizer, 0.2 parts by weight of ADEKASTAB LA502XP manufactured by ADEKA Corporation as a weathering stabilizer, 0.2 parts by weight of ADEKASTAB NA18 manufactured by ADEKA Corporation as a nucleating agent, and 0.1 parts by weight of glycerol monostearate as an antistatic agent were added. The mixture was stirred with a Henschel mixer for 1 minutes. The mixture was melt-kneaded and extruded with a co-rotating twin-screw extruder having a screw diameter of 15 mm manufactured by Technovel Corporation, at a cylinder temperature of 230° C. The strand was cooled in water, and then cut by a pelletizer, thereby providing a polypropylene composition made from or containing the polymer in a pellet form.

Example 2

A polypropylene composition was produced and evaluated in the same manner as for Example 1, except that the hydrogen concentration in the first-stage reactor was changed to 2.17 mol %, the hydrogen concentration in the second stage reactor was changed to 2.21 mol %, and the residence time distribution in the first stage and the second stage was adjusted to have component (2)/[component (1)+component (2)] of 37.2% by weight.

Example 3

A polypropylene composition was produced and evaluated in the same manner as for Example 1, except that the hydrogen concentration in the first-stage reactor was changed to 2.17 mol %, the molar ratio C2/(C2+C3) in the second-stage reactor was changed to a molar ratio of 0.20, and the residence time distribution in the first stage and the second stage was adjusted to have component (2)/[component (1)+component (2)] of 34.4% by weight.

Example 4

A polypropylene composition was produced and evaluated in the same manner as for Example 2, except that the hydrogen concentration in the first-stage reactor was changed to 2.48 mol %, and the hydrogen concentration and the molar ratio C2/(C2+C3) in the second-stage reactor was changed to 2.04 mol % and a molar ratio of 0.27, respectively.

Example 5

A polypropylene composition was produced and evaluated in the same manner as for Example 2, except that the hydrogen concentration in the first-stage reactor was changed to 2.74 mol %, and the hydrogen concentration and the molar ratio C2/(C2+C3) in the second-stage reactor was changed to 1.75 mol % and a molar ratio of 0.17, respectively.

Example 6

A solid catalyst composed of Ti and diisobutylphthalate as an internal donor supported on $MgCl_2$ was prepared by a method described in lines 21 to 36 in paragraph 32 of Japanese Patent Publication No. JP2004-27218A.

Under nitrogen atmosphere at 120° C., 56.8 g of anhydrous magnesium chloride was dissolved in 100 g of anhydrous ethanol, 500 mL of Vaseline oil "CP 15N" manufactured by Idemitsu Kosan Co. Ltd., and 500 mL of silicone oil "KF96" manufactured by Shin-Etsu Chemical Co., Ltd. The solution was stirred with a T. K. Homomixer manufactured by PRIMIX Corporation at 120° C. and 5000 rpm for 2 minutes. While stirring, the solution was poured into 2 L of anhydrous heptane. The temperature was kept under 0° C. The resulting white solid was washed with anhydrous heptane, vacuum dried at room temperature. Ethanol was partially removed under nitrogen stream, thereby yielding 30 g of spherical solid of $MgCl_2.1.2C_2H_5OH$.

In 200 mL of anhydrous heptane, 30 g of spherical solid of $MgCl_2.1.2C_2H_5OH$ was suspended. While stirring at 0° C., 500 mL of titanium tetrachloride was dropped therein over 1 hour. Subsequently, after the suspension was heated to 40° C., 4.96 g of diisobutylphthalate was added thereto, and the temperature was raised to 100° C. in about 1 hour. After the reaction at 100° C. for 2 hours, the solid portion was collected by hot filtration. Then, 500 mL of titanium tetrachloride was added to the reactant, and after stirring, the reaction proceeded at 120° C. for 1 hour. After completion of the reaction, the solid portion was collected again by hot filtration and washed with 1.0 L of hexane at 60° C. 7 times and with 1.0 L of hexane at room temperature 3 times, thereby obtaining a solid catalyst. The titanium content in the solid catalyst component was measured to be 2.36% by weight.

With use of the solid catalyst, a polypropylene composition was produced and evaluated in the same manner as for Example 1. However, the hydrogen concentration in the first-stage reactor was changed to 2.24 mol %, the hydrogen concentration and the molar ratio C2/(C2+C3) in the second-stage reactor were changed to 2.04 mol % and a molar ratio of 0.23, respectively. The residence time distribution in the first stage and the second stage was adjusted to have component (2)/[component (1)+component (2)] of 34.1% by weight. The powder propylene homopolymer component (1) had an average particle size of 1.2 mm and an average pore diameter of 7.0 μm.

Comparative Example 1

A polypropylene composition was produced and evaluated in the same manner as for Example 6, except that the hydrogen concentration in the first-stage reactor was changed to 1.75 mol %, the hydrogen concentration and the molar ratio C2/(C2+C3) in the second-stage reactor were changed to 1.88 mol % and a molar ratio of 0.21, respectively. The residence time distribution in the first stage and the second stage was adjusted to have component (2)/[component (1)+component (2)] of 28.4% by weight.

TABLE 1

Examples and Comparative Example

| | | Example | | | | | | Comparative Example |
|---|---|---|---|---|---|---|---|---|
| | | 1 | 2 | 3 | 4 | 5 | 6 | 1 |
| Component (1), component (2), and polymer consisting of component (1) and component (2) | | | | | | | | |
| MFR of component (1) | g/10 min | 218 | 180 | 181 | 224 | 264 | 190 | 126 |
| XI of component (1) | % by weight | 98.3 | 98.3 | 98.5 | 98.1 | 98.1 | 98.6 | 98.0 |
| Mw/Mn of XI of component (1) | — | 5.5 | 5.5 | 5.5 | 5.5 | 5.5 | 5.5 | 5.5 |
| Average pore diameter (Dn) of component (1) | μm | 9.4 | 9.4 | 9.4 | 9.4 | 9.4 | 7.0 | 7.0 |
| Average particle size (diameter) of component (1) | mm | 2.2 | 2.2 | 2.2 | 2.2 | 2.2 | 1.2 | 1.2 |
| Ethylene-derived unit of component (2) | % by weight | 27.4 | 27.5 | 26.2 | 31.6 | 23.3 | 28.5 | 27.5 |
| Component (2)/[component (1) + component (2)] | % by weight | 36.0 | 37.2 | 34.4 | 37.3 | 37.2 | 34.1 | 28.4 |
| XSIV of [component (1) + component (2)] | dl/g | 2.3 | 2.1 | 2.3 | 2.2 | 2.4 | 2.2 | 2.3 |
| MFR of [component (1) + component (2)] | g/10 | 29 | 29 | 28 | 30 | 28 | 32 | 30 |
| Powder flowability of [component (1) + component (2)] | — | 1.5 | 1.5 | 1.5 | 1.5 | 1.5 | 3.8 | 1.5 |
| Polypropylene composition in pellet form | | | | | | | | |
| [component (1) + component (2)] | Part by weight | 100 | 100 | 100 | 100 | 100 | 100 | 100 |
| Additive | Part by weight | 0.8 | 0.8 | 08 | 0.8 | 0.8 | 0.8 | 0.8 |
| Molded article | | | | | | | | |
| Flexural modulus | MPa | 1,050 | 990 | 1,060 | 1,000 | 920 | 1,130 | 1,230 |
| Charpy impact strength | kJ/m$^2$ | 50 | 51 | 30 | 51 | 52 | 40 | 12 |
| Nominal tensile strain at break | % | 42 | 58 | 47 | 32 | 400 | 39 | 35 |

[Measurement Condition]

1) MFR

To 5 g of a powder sample, 0.05 g of H-BHT manufactured by Honshu Chemical Industry Co., Ltd. was added. After homogenization by dry blending, measurement was performed under conditions at a temperature of 2.30° C. and under a load of 2.16 kg in accordance with JIS K6921-2.

2) XI of Component (1)

While stirring, 2.5 g of a polymer was dissolved in 250 mL of xylene at 135° C. After 20 minutes, the solution was cooled to 25° C. while stirring, and then left standing for 30 minutes. The precipitate was filtered with a filter paper, and the solution was evaporated in a nitrogen stream. The residue was dried under vacuum at 80° C. The % by weight of polymers soluble in xylene at 25° C. was thus calculated. The amount of xylene insolubles (% by weight of polymers insoluble in xylene at 25° C., XI) was determined from 100-"% by weight of soluble polymers", which herein represents the amount of isotactic components of the polymer. To collect xylene insolubles, the precipitate was washed with methanol to remove residual xylene and then dried under vacuum at 80° C.

3) Mw/Mn of XI Component of Component (1)

The sample of xylene insolubles was subjected to measurement of molecular weight distribution (Mw/Mn). PL GPC220 manufactured by Polymer Laboratories Ltd, was used as apparatus, 1,2,4-trichlorobenzene containing an antioxidant was used as mobile phase, an UT-G, an UT-807 and two UT-806M manufactured by Showa Denko K.K. were connected in series for use as a column, and a differential refractometer was used as detector. The solvent for the sample was the same as the mobile-phase solvent. Through dissolution at a concentration of 1 mg/mL for 2 hours while shaking at a temperature of 150° C., a sample for measurement was prepared. Into the column, 500 μL of the sample solution was injected at a flow rate of 1.0 mL/min, a temperature of 145° C., and an interval of data acquisition of 1 second. The calibration of the column was made through a cubic spline with use of a polystyrene sample (SHODEX STANDARD manufactured by Showa Denko K.K.) having a molecular weight of 5800000 to 7450000. As Mark-Houwink-Sakurada coefficients, K=1.21×10$^{-4}$ and α=0.707 were used for the polystyrene sample, and K=1.37×10$^{-4}$ and α=0.75 were used for the polypropylene homopolymer, the propylene random copolymer, and the polypropylene polymer.

4) Average Particle Size and Average Pore Diameter of Component (1)

The bulk density of component (1) was measured with a full-automatic pore distribution measurement apparatus PORE MASTER 60-GT manufactured by Quanta Chrome Corporation. The average particle size of component (1) was obtained by measuring the number of particles per gram to determine the average weight per piece, determining the average volume per piece from the bulk density, and calculating the average diameter as a sphere from the average volume. Also, using the same apparatus, the distribution of pore diameter D was measured in the range of 1 μm to 100 μm by the mercury intrusion method according to JIS 81655 to calculate the average pore diameter Dn from the following equation:

$$Dn = \int (-dV/d \log D) d \log D / \int (1/D)(-dV/d \log D) d \log D$$

wherein V represents the sample volume, which corresponds to the subtraction of pore volume from volume (bulk volume) of each particle.

5) Ethylene-Derived Unit of Component (2)

A $^{13}$C-NMR spectrum of the sample dissolved in a mixed solvent of 1,2,4-trichlorobenzene and deuterated benzene was obtained by using AVANCE III HD400 ($^{13}$C resonance frequency: 100 MHz) manufactured by Broker Corporation, under conditions of a measurement temperature of 120° C., a flip angle of 45 degrees, a pulse interval of 7 seconds, a sample rotation number of 20 Hz, and a cumulative number of 5000.

A total amount of ethylene (% by weight) in the polymer made from or containing component (1) and component (2) was determined as described in Kakugo, Y. Naito, K. Mizunuma and T. Miyatake, Macromolecules 15, 1150-1152

(1982). The ethylene content (% by weight) in component (2) was obtained by the same method as that for calculating the total amount of ethylene, except that the integrated intensity T'ββ obtained from the following equation was used instead of the integrated intensity Tββ obtained in the measurement of the total amount of ethylene:

$$T'\beta\beta = 0.98 \times S\alpha\gamma \times A/(1-0.98 \times A)$$

wherein A=Sαγ/(Sαγ+Sαδ) is calculated from Sαγ and Sαδ as described in Kakugo, Y. Naito, K. Mizunuma and T. Miyatake, Macromolecules 15, 1150-1152 (1982).

6) Weight Ratio Component (2)/[Component (1)+Component (2)]

The content of component (2) relative to the total weight of component (1) and component (2) was determined from the following equation:

Content (% by weight) of component (2)=[total ethylene content of polymer made from or containing component (1) and component (2)/ethylene content in component (2)]×100

7) Intrinsic Viscosity (XSIV) of [Component (1)+Component (2)]

Xylene solubles in the polymer made from or containing component (1) and component (2) was obtained by the method to measure the intrinsic viscosity (XSIV) of the xylene solubles.

In a flask containing 250 mL of o-xylene (solvent), 2.5 g of a sample of the polymer made from or containing component (1) and component (2) was added. The solvent was stirred for 30 minutes at 135° C. while purging nitrogen by using a hot plate and a reflux device, thereby dissolving the polymer. The solution was cooled at 25° C. for 1 hour. The solution was filtered with a filter paper. After the filtration, 100 mL of the filtrate was collected, transferred into an aluminum cup, evaporated to dryness at 140° C. while purging nitrogen, and left standing for 30 minutes at room temperature, whereby xylene solubles was obtained.

The intrinsic viscosity was measured in tetrahydronaphthalene at 135° C., using an automatic capillary viscometer (SS-780-H1, manufactured by Shibayama Scientific Co., Ltd.), 8) Powder Flowability On a metal plate, a metal frame having an opening with a length of 5 cm, a width of 5 cm, and a height of 1 cm was placed. In the metal frame, 5 g of polymer made from or containing component (1) and component (2) was spread. A metal lid having a weight of 0.92 g was placed in the metal frame. A uniform pressure of 23 g/cm² was applied to the sample. After the sample in the metal frame was held at 70° C. for 20 minutes, the metal frame and the metal lid were removed. The metal plate was tilted to make the following 5-grade evaluation 4 times for calculation of the average.

1: The total volume of sample collapses when the substrate is tilted at 0° or more and less than 30°.

2: The total volume of sample collapses when the substrate is tilted at 30° or more and less than 50°.

3: The total volume of sample collapses when the substrate is tilted at 50° or more and less than 70°.

4: The total volume of sample collapses when the substrate is tilted at 70° or more and less than 90°.

5: No total volume collapse occurs even when the substrate is tilted at 90° or more.

The metal plate, the metal frame and the metal lid were made of stainless steel SUS 304. The surface of the metal plate was #400-grit polished (sisal finish) to have a surface roughness (maximum roughness Ry) of 0.2 µm.

9) Flexural Modulus

The measurement was made in accordance with JIS K6921-2. A polypropylene composition was injection molded using FANUC ROBOSHOT S2000i manufactured by FANUC Corporation under conditions of a molten resin temperature of 200° C., a mold temperature of 40° C., an average injection rate of 200 mm/s, a holding time of 40 seconds, and a total cycle time of 60 seconds, thereby making a multi-purpose test piece (type A1) as described in JIS K7139. The molded article was processed to have a width of 10 mm, a thickness of 4 mm, and a length of 80 mm, thereby obtaining a measurement test piece (type B2). The flexural modulus of the test piece of type B2 was measured using a precision universal tester (AUTOGRAPH AG-X 10 kN manufactured by Shimadzu Corporation), under conditions of a temperature of 23° C., a relative humidity of 50%, a distance between supporting points of 64 mm, and a testing speed of 2 mm/min.

10) Charpy Impact Strength

In accordance with its JIS K6921-2, a test piece of type A1 obtained in the same operation as for the test piece for use in the flexural modulus was measured. In accordance with JIS K7111-1 and after processing to have a width of 10 mm, a thickness of 4 mm, and a length of 80 mm, a 2-mm notch was made in the width direction, using a notching tool A-4 manufactured by Toyo Seiki Seisaku-sho, Ltd., resulting in the measurement test piece having a shape A. The Charpy impact strength (edgewise impact, method 1 eA) of the test piece was measured using a full-automatic impact tester having a cryostat (No. 258-ZA) manufactured by Yasuda Seiki Seisakusho Ltd., under conditions of a temperature of 23° C. and a relative humidity of 50%.

11) Nominal Tensile Strain at Break

In accordance with JIS K6921-2, a test piece of type A1 obtained in the same operation as for the test piece for use in the flexural modulus was measured. In accordance with JIS K7161-2, the nominal tensile strain at break was measured using a precision universal tester (AUTOGRAPH AG-X 10 kN) manufactured by Shimadzu Corporation, under conditions of a temperature of 23° C., a relative humidity of 50%, and a testing speed of 50 mm/min.

What is claimed is:

1. A polypropylene composition comprising:
a polymer comprising
  (i) component (1) comprising a propylene homopolymer having an MFR of 100 to 300 (at a temperature of 230° C. under a load of 2.16 kg) and containing, based upon the total weight of the propylene homopolymer, more than 97.5% by weight of xylene insolubles (XI), wherein XI of the propylene homopolymer has a Mw/Mn of 4 to 10 as measured by GPC, wherein the component (1) is porous particles having an average particle diameter of 1.5 to 4.0 mm and an average pore diameter (Dn) of 8 to 50 µm; and
  (ii) component (2) comprising an ethylene/propylene copolymer containing 15 to 50% by weight of an ethylene-derived unit, based upon the total weight of the ethylene/propylene copolymer;
wherein
1) the relative proportions of component (1) and component (2) are, respectively, not less than 50 parts by weight but less than 70 parts by weight and more than 30 parts by weight but not more than 50 parts by weight, based upon the total weight of the polymer,
2) the intrinsic viscosity of xylene solubles (XSIV) of the polymer is in the range of 1.5 to 4.0 dl/g, and 3) the MFR (at a temperature of 230° C. under a load of 2.16 kg) of the polymer is in the range of 20 to 100 g/10 min.

2. The polypropylene composition according to claim 1, wherein the component (1) is porous particles having an average particle diameter of 1.5 to 3.0 mm and an average pore diameter (Dn) of 8 to 30 μm; and the polymer is a powder, and flowability of the powder is equal to or less than 3.5.

3. A pellet shaped polypropylene composition produced from the polypropylene composition according to claim 1.

4. A molded article obtained by injection molding of the polypropylene composition according to claim 1.

* * * * *

UNITED STATES PATENT AND TRADEMARK OFFICE
CERTIFICATE OF CORRECTION

PATENT NO. : 11,459,454 B2
APPLICATION NO. : 17/051109
DATED : October 4, 2022
INVENTOR(S) : Yokoyama et al.

It is certified that error appears in the above-identified patent and that said Letters Patent is hereby corrected as shown below:

In the Specification

In Column 1, Line 52, delete "2.0" and insert -- 20 --, therefor

In Column 2, Line 55, delete "1)" and insert -- D --, therefor

In Column 3, Line 36, delete "2.5" and insert -- 25 --, therefor

In Column 5, Line 50, delete "$Ti(OCH_3)_2Cl_3$" and insert -- $Ti(OCH_3)Cl_3$ --, therefor In Column 5, Line 54, delete "$Ti(OC_2H_5)Cl_2$" and insert -- $Ti(OC_2H_5)_2Cl_2$ --, therefor In Column 5, Line 54, delete "$Ti(O_n\text{-}C_4H_9)_2Cl_3$" and insert -- $Ti(O_n\text{-}C_4H_9)_2Cl_2$ --, therefor In Column 6, Line 9, delete "organoalutninium." and insert -- organoaluminium. --, therefor In Column 6, Line 55, delete "JP 495992013." and insert -- JP 4959920B. --, therefor In Column 7, Line 8, delete "dibutylalurninum" and insert -- dibutylaluminum --, therefor In Column 7, Line 14, delete "alkylalutninum" and insert -- alkylaluminum --, therefor In Column 7, Line 22, delete "diethylalutninum" and insert -- diethylaluminum --, therefor In Column 11, Line 7, delete "UHT-4A" and insert -- DHT-4A --, therefor In Column 14, Line 46, delete "JIS 81655" and insert -- JIS R1655 --, therefor Signed and Sealed this
Twenty-third Day of January, 2024

*Katherine Kelly Vidal*
Katherine Kelly Vidal
*Director of the United States Patent and Trademark Office*

In Column 14, Line 59, delete "Broker" and insert -- Bruker --, therefor

In Column 16, Line 20, after "with" delete "its"